(12) United States Patent
Kwon

(10) Patent No.: US 9,643,537 B2
(45) Date of Patent: May 9, 2017

(54) REGURATING SOUND GENERATING SYSTEM FOR ENVIRONMENT FRIENDLY VEHICLE AND A METHOD FOR CONTROLLING THE SYSTEM

(71) Applicant: DAESUNG ELECTRIC CO., LTD, Ansan-si, Gyeonggi-do (KR)

(72) Inventor: Dae Woo Kwon, Suwon-si (KR)

(73) Assignee: DAESUNG ELECTRIC CO., LTD, Ansan-si, Gyeonggi-Do (KR)

( * ) Notice: Subject to any disclaimer, the term of this patent is extended or adjusted under 35 U.S.C. 154(b) by 0 days.

(21) Appl. No.: 15/196,137

(22) Filed: Jun. 29, 2016

(65) Prior Publication Data

US 2017/0001558 A1  Jan. 5, 2017

(30) Foreign Application Priority Data

Jun. 30, 2015 (KR) .................. 10-2015-0093096

(51) Int. Cl.
  *G08G 1/005* (2006.01)
  *B60Q 5/00* (2006.01)
(52) U.S. Cl.
  CPC .................................. *B60Q 5/008* (2013.01)
(58) Field of Classification Search
  CPC ................................................... B60Q 5/008
  See application file for complete search history.

(56) References Cited

U.S. PATENT DOCUMENTS 3,831,192 A * 8/1974 Gross ................... G11B 20/225
                                                        360/26
5,635,903 A   6/1997 Koike et al.
(Continued)

FOREIGN PATENT DOCUMENTS

JP   2013-205478 A   10/2013
KR   10-0985767 B1   10/2010
KR   2012-0078120 A   7/2012

OTHER PUBLICATIONS

Eisele et al., "Electric vehicle sound design—Just wishful thinking?" AAC 2010, Nov. 23, 2010, pp. 47-59.
European Search Report issued on Dec. 1, 2016.

*Primary Examiner* — Joseph Feild
*Assistant Examiner* — Pameshanand Mahase
(74) *Attorney, Agent, or Firm* — Rabin & Berdo, P.C.

(57) ABSTRACT

An environmentally-friendly vehicle sound generator control apparatus. The apparatus includes a sound playback unit including a sound comparison unit for comparing a frequency band-specific reference sound level data with an extracted plurality of frequency band-specific sound data for each frequency band in response to a comparison control signal of a control unit, a sound control unit for controlling a pitch or a volume of a plurality of frequency band-specific sample sound source data to form a plurality of frequency band-specific sample control sound source data if the extracted plurality of frequency band-specific sound data is smaller than the frequency band-specific reference sound level data, and a sound mixing unit for mixing the plurality of frequency band-specific sample control sound source data and transferring the mixed plurality of frequency band-specific sample control sound source data to the sound output unit so that a pedestrian's vehicle recognition sound can be outputted.

21 Claims, 9 Drawing Sheets

(56) References Cited

U.S. PATENT DOCUMENTS

| | | | |
|---|---|---|---|
| 2011/0032122 A1* | 2/2011 | Hayashi | G08G 1/04 340/943 |
| 2012/0062391 A1 | 3/2012 | Pan | |
| 2012/0166042 A1* | 6/2012 | Kokido | B60Q 5/008 701/36 |
| 2012/0299718 A1* | 11/2012 | Yoshino | B60Q 1/22 340/466 |
| 2015/0139442 A1* | 5/2015 | Kreifeldt | G10K 15/02 381/86 |
| 2015/0151680 A1 | 6/2015 | Park et al. | |

* cited by examiner

REGURATING SOUND GENERATING SYSTEM FOR ENVIRONMENT FRIENDLY VEHICLE AND A METHOD FOR CONTROLLING THE SYSTEM

CROSS-REFERENCE TO RELATED APPLICATIONS

This application claims the benefit of Korean Patent Application No. 10-2015-0093096, filed on Jun. 30, 2015 in the Korean Intellectual Property Office, which is incorporated herein by reference in its entirety.

BACKGROUND OF THE INVENTION

1. Field of the Invention

The present invention relates to an environmentally-friendly vehicle sound generator control apparatus and a control method thereof. More specifically, the present invention relates to an environmentally-friendly vehicle sound generator control apparatus and a control method thereof, that generate and control a virtual sound, i.e., an operating sound, which is close to a real engine sound while remarkably increasing recognizability so that the vehicle sound can be transferred to a driver and a pedestrian to further secure safety of the pedestrian and induce safe drive of the driver.

2. Description of Related Art

In recent years, due to depletion of energy, the development of an environmentally-friendly vehicle as an alternative transportation means is in increasingly active progress. Examples of representative environmentally-friendly vehicles include hybrid vehicles, electric vehicles, hydrogen fuel cell electric vehicles and the like. Since such an environmentally-friendly vehicle does not adopt a method of operating an engine, it does not generate an engine noise or the like while driving unlike an existing internal combustion engine vehicle. Accordingly, the establishment of regulations on the environmentally-friendly vehicles is being prepared to protect pedestrians around a vehicle, and the research and development of a virtually operating sound generation system of an environmentally-friendly vehicle are required in relation to the establishment of regulations.

That is, an environmentally-friendly vehicle such as a hybrid vehicle, an electric vehicle, a hydrogen fuel cell electric vehicle or the like does not generate an engine's unique sound generated from a gasoline vehicle or a diesel vehicle. For this reason, there occur problems in that an accident may occur since a pedestrian does not recognize a vehicle approaching the pedestrian or a vehicle at a place such as an alley or an indoor parking lot, and in that it is also difficult for a driver to recognize the startup state or the current state of a vehicle since a vehicle noise is not generated.

Furthermore, a vehicle including a recharge energy system, such as an electric vehicle, a hydrogen fuel cell electric vehicle or the like, entails problems in that it is difficult to know whether the recharge is started or finished, and in that it is very inconvenient to use the vehicle due to extreme insufficiency of vehicle information that can be recognized by a driver in relation to a risk caused by discharge of a battery or deficiency of fuel.

In an attempt to solve such problems, apparatuses for generating a virtual engine sound for environmentally-friendly vehicles are recently developed. However, virtual engine sound generation apparatuses that are being currently developed simply generate a sound similar to an engine sound associated with the driving of a vehicle and cannot provide various functions to a pedestrian or a driver, and its technical level is still insignificant since information on the current state of the vehicle is provided insufficiently.

In Particular, although the engine of a vehicle starts, the startup state of the engine cannot be identified since an engine startup sound unique to the vehicle is not generated. In addition, since only a message informing that the vehicle can travel is simply displayed on the cluster of the vehicle, it is insufficient for the transmission of the current vehicle state to the driver. Further, although an environmentally-friendly vehicle includes an apparatus for generating a virtual engine sound, currently, the apparatus merely generates a sound similar to a sound of a vehicle according to the speed of the vehicle and informs a pedestrian of approach of the vehicle by increasing or decreasing the volume when the vehicle travels in a specific speed section. However, such a conventional apparatus encounters a problem in that the driver and the pedestrian may feel uncomfortable since the actual behavior of the driver accelerating or decelerating the vehicle somewhat does not match with the generated virtual engine sound of the vehicle. In addition, there is also a problem in that since the driver who is a subject of driving the vehicle is not informed of the current state of the vehicle, he or she cannot properly grasp the current state of the vehicle.

Besides, such a conventional technology controls only volume of a sound, and, furthermore, it is difficult to confirm whether or not a normal sound source is output through a general self-diagnosis on the volume control.

As an example of the prior art, there has been disclosed Korean Patent Registration No. 10-985767.

In addition, although such a conventional technology outputs a sound similar to an engine sound, it takes a structure in which recognizability of a sound source itself is low or the volume increases or decreases merely according to the speed. The use of such a sound source leads to an increase in the necessity for confirmation of whether or not the virtual sound is correctly delivered to a pedestrian in relation to surrounding noises. A process of confirming the recognizability is required to be performed through a repetitive work, and there is involved a problem in that considerable time and manpower are required in the repetitive process of controlling, outputting and reconfirming a sound source.

SUMMARY OF THE INVENTION

The present invention has been made to solve the above-mentioned problems associated with the prior art, and it is an object of the present invention to provide an environmentally-friendly vehicle sound generator control apparatus and a control method thereof, which make it possible to manufacture an environmentally-friendly vehicle sound generator that can derive a sound source which enables a prompt control for each frequency band to increase recognizability, further secure safety of pedestrians accordingly, and induce safe drive of a driver, by way of forming sample sound sources for a plurality of frequency bands from a single engine sound of a real internal combustion engine, accomplishing pitch shift and volume level control, and generating a mixed output of corresponding sample sound sources according to the driving speed of a vehicle.

Another object of the present invention is to provide an environmentally-friendly vehicle sound generator control apparatus and a control method thereof, which can provide pitch control points and volume control points for changing pitch shift and volume level control for each frequency band according to the driving speed of a vehicle, and form a linear interconnection structure between the pitch control points and the volume control points to make it possible to simply and promptly control a sound source, thereby reducing the working hours of a worker and saving the manufacturing cost through reduction of the working hours.

To achieve the above objects, in one aspect, the present invention provides an environmentally-friendly vehicle sound generator control apparatus, including: a storage unit including a sound source storage unit for storing a plurality of frequency band-specific sample sound source data of a real single engine sound of an internal combustion engine vehicle, and a reference data storage unit for storing frequency band-specific reference sound level data; a sound output unit arranged in an environmentally-friendly vehicle to output a pedestrian's vehicle recognition sound; a sound sensing unit arranged to be spaced apart from the sound output unit to sense the pedestrian's vehicle recognition sound output from the sound output unit; a sound source sound extraction unit for extracting and dividing the pedestrian's vehicle recognition sound sensed by the sound sensing unit for each of a plurality of frequency bands; a control unit for storing the frequency band-specific sound data of the pedestrian's vehicle recognition sound extracted and divided by the sound source sound extraction unit in a sound storage unit of the storage unit; and a sound playback unit including a sound comparison unit for comparing the frequency band-specific reference sound level data with the extracted plurality of frequency band-specific sound data for each frequency band in response to a comparison control signal of the control unit, a sound control unit for controlling the pitch or the volume of the plurality of frequency band-specific sample sound source data to form a plurality of frequency band-specific sample control sound source data if the extracted plurality of frequency band-specific sound data is smaller than the frequency band-specific reference sound level data, and a sound mixing unit for mixing the plurality of frequency band-specific sample control sound source data and transferring the mixed plurality of frequency band-specific sample control sound source data to the sound output unit so that the sound output unit can output the pedestrian's vehicle recognition sound.

In the environmentally-friendly vehicle sound generator control apparatus, the sound control unit may include a pitch control unit including pitch control points for enabling to form a plurality of new frequency band-specific sample control sound source data by pitch-shifting the plurality of frequency band-specific sample sound source data for each driving speed of the environmentally-friendly vehicle to control the pitch, and a volume control unit including volume control points for enabling to form a plurality of new frequency band-specific sample control sound source data by increasing or decreasing the volume of the plurality of frequency band-specific sample sound source data for each driving speed of the environmentally-friendly vehicle to control the volume.

In the environmentally-friendly vehicle sound generator control apparatus, the plurality of frequency bands may include a low frequency band lower than 500 Hz, an intermediate frequency band ranging from 2,000 Hz to 5,000 Hz and a high frequency band higher than 5,000 Hz.

In the environmentally-friendly vehicle sound generator control apparatus, a linear connection may be formed between the pitch control points, and when the pitch control points are position-controlled, the linear connection may also be controlled in association with the pitch control points.

In the environmentally-friendly vehicle sound generator control apparatus, the ratio of the segment speed to pitch shift between the pitch control points may be 1% or higher per km/h.

In the environmentally-friendly vehicle sound generator control apparatus, a linear connection may be formed between the volume control points, and when the volume control points are position-controlled, the linear connection may also be controlled in association with the volume control points.

In the environmentally-friendly vehicle sound generator control apparatus, if the extracted plurality of frequency band-specific sound data is smaller than the frequency band-specific reference sound level data, the control unit may apply, a pitch control signal for controlling the pitch control points of a corresponding frequency band as much as a pitch control ratio included in a previously set data stored in the storage unit, to the sound control unit.

In the environmentally-friendly vehicle sound generator control apparatus, if the extracted plurality of frequency band-specific sound data is smaller than the frequency band-specific reference sound level data, the control unit may apply, a volume control signal for controlling the volume control points of a corresponding frequency band as much as a volume control ratio included in a previously set data stored in the storage unit, to the sound control unit.

In the environmentally-friendly vehicle sound generator control apparatus, if the extracted plurality of frequency band-specific sound data is smaller than the frequency band-specific reference sound level data, the control unit may apply, a pitch and volume control signal for controlling the pitch control points and the volume control points of a corresponding frequency band as much as a pitch control ratio and a volume control ratio included in a previously set data stored in the storage unit, to the sound control unit.

In another aspect, the present invention provides a method for controlling an environmentally-friendly vehicle sound generator control apparatus which includes: a storage unit including a sound source storage unit for storing a plurality of frequency band-specific sample sound source data of a real single engine sound of an internal combustion engine vehicle, and a reference data storage unit for storing frequency band-specific reference sound level data; a sound output unit arranged in an environmentally-friendly vehicle to output a pedestrian's vehicle recognition sound; a sound sensing unit arranged to be spaced apart from the sound output unit to sense the pedestrian's vehicle recognition sound output from the sound output unit; a sound source sound extraction unit for extracting and dividing the pedestrian's vehicle recognition sound sensed by the sound sensing unit for each of a plurality of frequency bands; a control unit for storing the frequency band-specific sound data of the pedestrian's vehicle recognition sound extracted and divided by the sound source sound extraction unit in a sound storage unit of the storage unit; and a sound playback unit including a sound comparison unit for comparing the frequency band-specific reference sound level data with the extracted plurality of frequency band-specific sound data for each frequency band in response to a comparison control signal of the control unit, a sound control unit for controlling the pitch or the volume of the plurality of frequency band-specific sample sound source data to form a plurality of frequency band-specific sample control sound source data if the extracted plurality of frequency band-specific sound data is smaller than the frequency band-specific reference sound level data, and a sound mixing unit for mixing the plurality of frequency band-specific sample control sound source data and transferring the mixed plurality of frequency band-specific sample control sound source data to the sound output unit so that the sound output unit can output the pedestrian's vehicle recognition sound, the method comprising: a provision step of providing the environmentally-friendly vehicle sound generator control apparatus; a sensing step of sensing, by the sound sensing unit, a pedestrian's vehicle recognition sound output from the sound output unit of an environmentally-friendly vehicle; a sound extraction and storage step of extracting and dividing the pedestrian's vehicle recognition sound sensed by the sound sensing unit for each of a plurality of frequency bands and storing the extracted and divided pedestrian's vehicle recognition sound in the sound storage unit of the storage unit; a sound comparison step of comparing the frequency band-specific reference sound level data with the extracted plurality of frequency band-specific sound data in response to a comparison control signal of the control unit; and a sound control step of forming a plurality of frequency band-specific sample control sound source data by controlling the pitch or the volume of the plurality of frequency band-specific sample sound source data if the extracted plurality of frequency band-specific sound data is smaller than the frequency band-specific reference sound level data at the sound comparison step.

In the method for controlling an environmentally-friendly vehicle sound generator control apparatus, the sound control unit may include a pitch control unit including pitch control points for enabling to form a plurality of new frequency band-specific sample control sound source data by pitch-shifting the plurality of frequency band-specific sample sound source data for each driving speed of the environmentally-friendly vehicle to control the pitch, and a volume control unit including volume control points for enabling to form a plurality of new frequency band-specific sample control sound source data by increasing or decreasing the volume of the plurality of frequency band-specific sample sound source data for each driving speed of the environmentally-friendly vehicle to control the volume, and the sound control step may include a pitch control step of, if the extracted plurality of frequency band-specific sound data is smaller than the frequency band-specific reference sound level data, applying, by the control unit, a pitch control signal for controlling the pitch control points of a corresponding frequency band as much as a pitch control ratio included in a previously set data stored in the storage unit, to the sound control unit.

In the method for controlling an environmentally-friendly vehicle sound generator control apparatus, the sound control unit may include a pitch control unit including pitch control points for enabling to form a plurality of new frequency band-specific sample control sound source data by pitch-shifting the plurality of frequency band-specific sample sound source data for each driving speed of the environmentally-friendly vehicle to control the pitch, and a volume control unit including volume control points for enabling to form a plurality of new frequency band-specific sample control sound source data by increasing or decreasing the volume of the plurality of frequency band-specific sample sound source data for each driving speed of the environmentally-friendly vehicle to control the volume, and the sound control step may include a volume control step of, if the extracted plurality of frequency band-specific sound data is smaller than the frequency band-specific reference sound level data, applying, by the control unit, a volume control signal for controlling the volume control points of a corresponding frequency band as much as a volume control ratio included in a previously set data stored in the storage unit, to the sound control unit.

In the method for controlling an environmentally-friendly vehicle sound generator control apparatus, the plurality of frequency bands may include a low frequency band lower than 500 Hz, an intermediate frequency band ranging from 2,000 Hz to 5,000 Hz and a high frequency band higher than 5,000 Hz.

In the method for controlling an environmentally-friendly vehicle sound generator control apparatus, a linear connection may be formed between the pitch control points, and when the pitch control points are position-controlled, the linear connection may also be controlled in association with the pitch control points.

In the method for controlling an environmentally-friendly vehicle sound generator control apparatus, the ratio of the segment speed to pitch shift between the pitch control points may be 1% or higher per km/h.

In the method for controlling an environmentally-friendly vehicle sound generator control apparatus, a linear connection may be formed between the volume control points, and when the volume control points are position-controlled, the linear connection may also be controlled in association with the volume control points.

In still another aspect, the present invention provides an environmentally-friendly vehicle sound generator control apparatus, which includes: a storage unit including a sound source storage unit for storing a plurality of frequency band-specific sample sound source data of a real single engine sound of an internal combustion engine vehicle, and a reference data storage unit for storing frequency band-specific reference sound level data; a sound output unit for outputting a pedestrian's vehicle recognition sound; a virtual sound sensing unit for transferring a signal by virtually processing the pedestrian's vehicle recognition sound output from the sound output unit as if the pedestrian's vehicle recognition sound was sensed, a sound source sound extraction unit for extracting and dividing the pedestrian's vehicle recognition sound virtually sensed by the sound sensing unit for each of a plurality of frequency bands; a control unit for storing the frequency band-specific sound data of the pedestrian's vehicle recognition sound extracted and divided by the sound source sound extraction unit in a sound storage unit of the storage unit; and a sound playback unit including a sound comparison unit for comparing the frequency band-specific reference sound level data with the extracted plurality of frequency band-specific sound data for each frequency band in response to a comparison control signal of the control unit, a sound control unit for controlling the pitch or the volume of the plurality of frequency band-specific sample sound source data to form a plurality of frequency band-specific sample control sound source data if the extracted plurality of frequency band-specific sound data is smaller than the frequency band-specific reference sound level data, and a sound mixing unit for mixing the plurality of frequency band-specific sample control sound source data and transferring the mixed plurality of frequency band-specific sample control sound source data to the sound output unit so that the sound output unit can output the pedestrian's vehicle recognition sound.

In yet another aspect, the present invention provides a method for controlling an environmentally-friendly vehicle sound generator control apparatus which includes: a storage unit including a sound source storage unit for storing a plurality of frequency band-specific sample sound source data of a real single engine sound of an internal combustion engine vehicle, and a reference data storage unit for storing frequency band-specific reference sound level data; a sound output unit for outputting a pedestrian's vehicle recognition sound; a virtual sound sensing unit for transferring a signal by virtually processing the pedestrian's vehicle recognition sound output from the sound output unit as if the pedestrian's vehicle recognition sound was sensed, a sound source sound extraction unit for extracting and dividing the pedestrian's vehicle recognition sound virtually sensed by the sound sensing unit for each of a plurality of frequency bands; a control unit for storing the frequency band-specific sound data of the pedestrian's vehicle recognition sound extracted and divided by the sound source sound extraction unit in a sound storage unit of the storage unit; and a sound playback unit including a sound comparison unit for comparing the frequency band-specific reference sound level data with the extracted plurality of frequency band-specific sound data for each frequency band in response to a comparison control signal of the control unit, a sound control unit for controlling the pitch or the volume of the plurality of frequency band-specific sample sound source data to form a plurality of frequency band-specific sample control sound source data if the extracted plurality of frequency band-specific sound data is smaller than the frequency band-specific reference sound level data, and a sound mixing unit for mixing the plurality of frequency band-specific sample control sound source data and transferring the mixed plurality of frequency band-specific sample control sound source data to the sound output unit so that the sound output unit can output the pedestrian's vehicle recognition sound, the method comprising: a provision step of providing the environmentally-friendly vehicle sound generator control apparatus; a virtual sound sensing step of transferring a signal by virtually processing the pedestrian's vehicle recognition sound output from the sound output unit of an environmentally-friendly vehicle as if the pedestrian's vehicle recognition sound was sensed by the virtual sound sensing unit; a sound extraction and storage step of extracting and dividing the pedestrian's vehicle recognition sound sensed by the virtual sound sensing unit for each of a plurality of frequency bands and storing the extracted and divided pedestrian's vehicle recognition sound in the sound storage unit of the storage unit; a sound comparison step of comparing the frequency band-specific reference sound level data with the extracted plurality of frequency band-specific sound data in response to a comparison control signal of the control unit; and a sound control step of forming a plurality of frequency band-specific sample control sound source data by controlling the pitch or the volume of the plurality of frequency band-specific sample sound source data if the extracted plurality of frequency band-specific sound data is smaller than the frequency band-specific reference sound level data at the sound comparison step.

In a further aspect, the present invention provides an environmentally-friendly vehicle sound generator control apparatus, which includes: a storage unit including a sound source storage unit for storing a plurality of frequency band-specific sample sound source data of a real single engine sound of an internal combustion engine vehicle, and a reference data storage unit for storing frequency band-specific reference sound level data; a sound output unit for outputting a pedestrian's vehicle recognition sound; a sound source sound extraction unit for extracting and dividing the pedestrian's vehicle recognition sound output from the sound output unit for each of a plurality of frequency bands; a control unit for storing the frequency band-specific sound data of the pedestrian's vehicle recognition sound extracted and divided by the sound source sound extraction unit in a sound storage unit of the storage unit; and a sound playback unit including a sound comparison unit for comparing the frequency band-specific reference sound level data with the extracted plurality of frequency band-specific sound data for each frequency band in response to a comparison control signal of the control unit, a sound control unit for controlling the pitch or the volume of the plurality of frequency band-specific sample sound source data to form a plurality of frequency band-specific sample control sound source data if the extracted plurality of frequency band-specific sound data is smaller than the frequency band-specific reference sound level data, and a sound mixing unit for mixing the plurality of frequency band-specific sample control sound source data and transferring the mixed plurality of frequency band-specific sample control sound source data to the sound output unit so that the sound output unit can output the pedestrian's vehicle recognition sound.

The environmentally-friendly vehicle sound generator control apparatus may further include a sound sensing unit for sensing the pedestrian's vehicle recognition sound output from the sound output unit, wherein the sound sensing unit may further include a virtual sound sensing unit for transferring a signal by virtually processing the pedestrian's vehicle recognition sound output from the sound output unit as if the pedestrian's vehicle recognition sound was sensed, and the sound source sound extraction unit may extract and divide the pedestrian's vehicle recognition sound virtually sensed by the sound sensing unit for each of a plurality of frequency bands.

In the environmentally-friendly vehicle sound generator control apparatus, the sound output unit may be a virtual sound output unit for virtually processing a sound playback data transferred from the sound playback unit and outputting the processed data as a pedestrian's vehicle recognition sound.

In a still further aspect, the present invention provides a method for controlling an environmentally-friendly vehicle sound generator control apparatus, which includes: a storage unit including a sound source storage unit for storing a plurality of frequency band-specific sample sound source data of a real single engine sound of an internal combustion engine vehicle, and a reference data storage unit for storing frequency band-specific reference sound level data; a sound output unit for outputting a pedestrian's vehicle recognition sound; a sound source sound extraction unit for extracting and dividing the pedestrian's vehicle recognition sound output from the sound output unit for each of a plurality of frequency bands; a control unit for storing the frequency band-specific sound data of the pedestrian's vehicle recognition sound extracted and divided by the sound source sound extraction unit in a sound storage unit of the storage unit; and a sound playback unit including a sound comparison unit for comparing the frequency band-specific reference sound level data with the extracted plurality of frequency band-specific sound data for each frequency band in response to a comparison control signal of the control unit, a sound control unit for controlling the pitch or the volume of the plurality of frequency band-specific sample sound source data to form a plurality of frequency band-specific sample control sound source data if the extracted plurality of frequency band-specific sound data is smaller than the frequency band-specific reference sound level data, and a sound mixing unit for mixing the plurality of frequency band-specific sample control sound source data and transferring the mixed plurality of frequency band-specific sample control sound source data to the sound output unit so that the sound output unit can output the pedestrian's vehicle recognition sound, the method comprising: a provision step of providing the environmentally-friendly vehicle sound generator control apparatus; a sensing step of sensing, by the sound sensing unit, a pedestrian's vehicle recognition sound output from the sound output unit of an environmentally-friendly vehicle; a sound extraction and storage step of extracting and dividing the pedestrian's vehicle recognition sound sensed by the virtual sound sensing unit for each of a plurality of frequency bands and storing the extracted and divided pedestrian's vehicle recognition sound in the sound storage unit of the storage unit; a sound comparison step of comparing the frequency band-specific reference sound level data with the extracted plurality of frequency band-specific sound data in response to a comparison control signal of the control unit; and a sound control step of forming a plurality of frequency band-specific sample control sound source data by controlling the pitch or the volume of the plurality of frequency band-specific sample sound source data if the extracted plurality of frequency band-specific sound data is smaller than the frequency band-specific reference sound level data at the sound comparison step.

In the method for controlling the environmentally-friendly vehicle sound generator control apparatus, the environmentally-friendly vehicle sound generator control apparatus may further include a sound sensing unit for sensing the pedestrian's vehicle recognition sound output from the sound output unit, wherein the sound sensing unit may further include a virtual sound sensing unit for transferring a signal by virtually processing the pedestrian's vehicle recognition sound output from the sound output unit as if the pedestrian's vehicle recognition sound was sensed, and the sound source sound extraction unit may extract and divide the pedestrian's vehicle recognition sound virtually sensed by the sound sensing unit for each of a plurality of frequency bands. The control method may further include a virtual sensing step of transferring, before executing the sound extraction and storage step, a virtual signal as if the virtual sound sensing unit sensed the pedestrian's vehicle recognition sound output from the sound output unit of the environmentally-friendly vehicle, and the pedestrian's vehicle recognition sound virtually sensed by the sound sensing unit may be extracted and divided for each of a plurality of frequency bands at the sound extraction and storage step.

According to the present invention, a pedestrian's vehicle recognition output sound with increased recognizability is formed and confirmed promptly so that the control time of a worker can be shortened and the number of works of the worker can be reduced, thereby reducing the manufacturing time and saving the manufacturing cost.

In addition, a warning sound with improved recognizability can be derived within a corresponding working period of time since the control time per work of a worker is reduced, and thus there is an effect of enabling to manufacture a sound generator capable of further securing safety of a pedestrian and inducing safe drive of a driver.

EXPLANATION ON SYMBOLS

Figure 1:
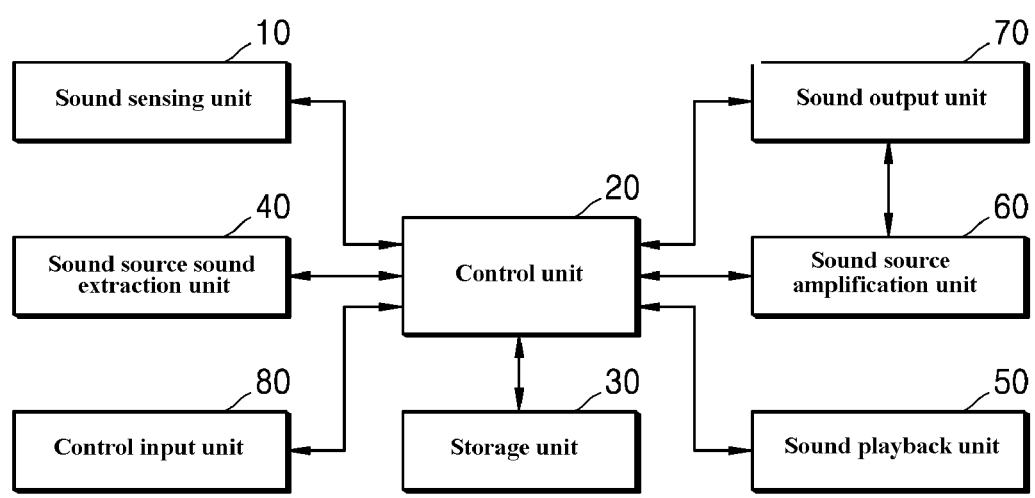
FIG. 1 is a functional block diagram functionally showing the configuration of an environmentally-friendly vehicle sound generator control apparatus according to an embodiment of the present invention.
Figure 2:
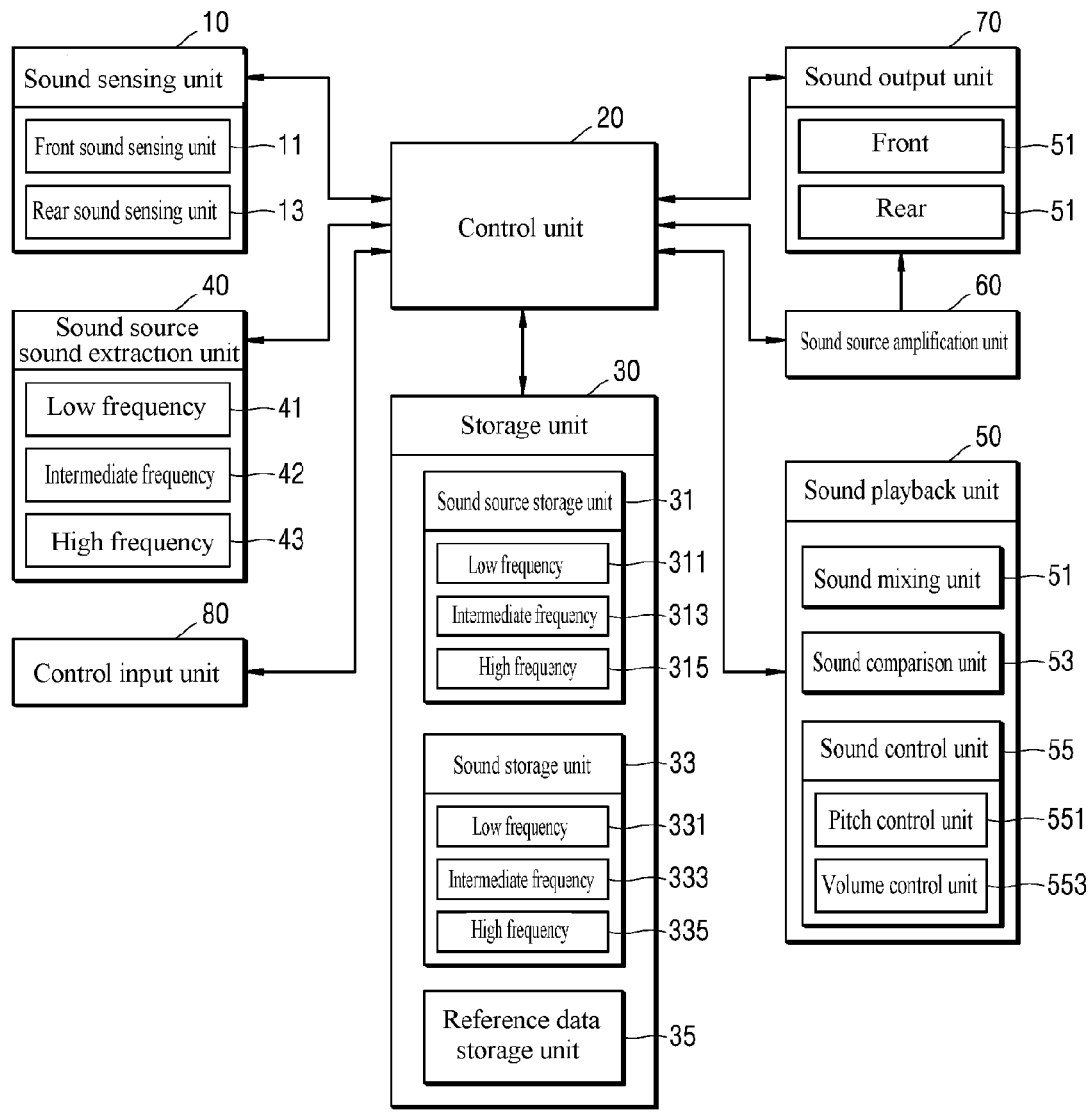
FIG. 2 is an exploded functional block diagram functionally showing the specific configuration of an environmentally-friendly vehicle sound generator control apparatus according to an embodiment of the present invention.
Figure 3:
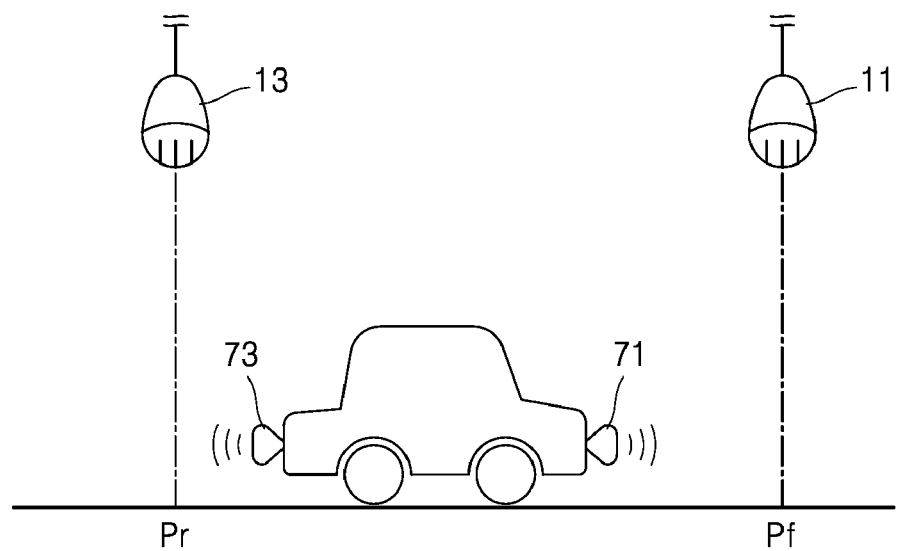
FIG. 3 is an operating state diagram showing a state of sensing an output sound of an environmentally-friendly vehicle by an environmentally-friendly vehicle sound generator control apparatus according to an embodiment of the present invention.

10: sound sensing unit
30, a 40, a 50 and a 70.
20: control unit
30: storage unit
40: sound source sound extraction unit
50: sound playback unit
60: Sound source amplification unit
70: Sound output unit
80: Control input unit

DESCRIPTION OF THE PREFERRED EMBODIMENTS

Now, preferred embodiments of the present invention will be described hereinafter in detail with reference to the accompanying drawings. It should be noted that the same elements in the drawings are denoted by the same reference numerals although shown in different figures. In the following description, the detailed description on known function and constructions unnecessarily obscuring the subject matter of the present invention will be avoided hereinafter.

An environmentally-friendly vehicle sound generator control apparatus 1 according to an embodiment of the present invention is an environmentally-friendly vehicle sound generator control apparatus which increases recognizability of a pedestrian so that the pedestrian can certainly recognize existence of the vehicle through the pedestrian's vehicle recognition sound in a situation where an environmentally-friendly vehicle travels, thereby enabling to generate the pedestrian's vehicle recognition sound for preventing occurrence of a vehicle accident. The environmentally-friendly vehicle sound generator control apparatus 1 includes a sound sensing unit 10, a control unit 20, a storage unit 30, a sound source sound extraction unit 40, a sound playback unit 50 and a sound output unit 70. In this embodiment, the environmentally-friendly vehicle sound generator control apparatus 1 further includes a sound source amplification unit 60 for amplifying sound source data which is to be transferred from the sound playback unit 50 to the sound output unit 70 and transferring the amplified sound source data to the sound output unit 70.

The environmentally-friendly vehicle sound generator control apparatus 1 of this embodiment stores an engine sound of a real internal combustion engine vehicle as a sound source. More specifically, the storage unit 30 includes a sound source storage unit 31, and the sound source storage unit 31 stores a real engine sound of an internal combustion engine vehicle, and although a single real engine sound is stored as a sound source, the single engine sound is divided and individually stored in a plurality of frequency bands. That is, the sound source storage unit 31 records and acquires a real single engine sound of an internal combustion engine vehicle, divides the engine sound for each frequency band, and stores a plurality of frequency band-specific sample sound source data, and the sound source storage unit 31 may include a low frequency sound source storage unit 311, an intermediate frequency sound source storage unit 313 and a high frequency sound source storage unit 315. Although it is described in this embodiment that the plurality of frequency band-specific sample sound source data of the real internal combustion engine sound is stored in the sound source storage unit 31 in advance, in some case, it may take a structure of sensing an engine sound by the sound sensing unit described below and extracting, dividing and storing the sound in each frequency band by the sound source sound extraction unit 40.

The storage unit 30 of the present invention also includes a sound storage unit 33, and the sound storage unit 33 may store frequency band-specific sound data of the pedestrian's vehicle recognition sound sensed by the sound sensing unit 10 described below and extracted and divided by the sound source sound extraction unit 40 in each of a plurality of frequency bands. In this embodiment, the sound storage unit 33 includes a low frequency sound storage unit 331, an intermediate frequency sound storage unit 333 and a high frequency sound source storage unit 335. Although these storage units can be configured as separate storage units, they may be modified in various manners, such as taking a structure of being virtually allocated to a single storage device.

In addition, the storage unit 30 of the present invention may further include a reference data storage unit 35 for storing previously set data or the like used by the sound comparison unit 53 or the sound control unit 55 which will be described below. The previously set data stored in the reference data storage unit 35 includes frequency band-specific reference sound level data compared with the frequency band-specific sound data of the pedestrian's vehicle recognition sound.

Although the sound source storage unit, the sound storage unit and the reference data storage unit are described as individual elements in this embodiment, it is apparent from this technique that the storage units can take a structure of being individually stored in a single storage unit.

The sound output unit 70 is implemented as a speaker arranged in an environmentally-friendly vehicle, and a pedestrian's vehicle recognition sound is output from the sound output unit 70, which performs a warning sound function to warn a pedestrian about existence of the environmentally-friendly vehicle.

The sound output unit 70 includes a front sound output unit 71 arrange on the front side of a vehicle and, in some case, may take a structure of further arranging a rear sound output unit 73 on the rear side of the vehicle to output a warning sound to a pedestrian behind the environmentally-friendly vehicle when the vehicle moves backwards.

The sound sensing unit 10 senses the pedestrian's vehicle recognition sound output from the sound output unit 70 of the environmentally-friendly vehicle, and the sound sensing unit 10 can be implemented as a microphone arranged at a predetermined relative position with respect to the environmentally-friendly vehicle.

The sound sensing unit 10 includes a front sound sensing unit 11 for sensing the front side of a vehicle, i.e., a pedestrian's vehicle recognition sound at the front side of the vehicle and, in some cases, may further include a rear sound sensing unit 13 for sensing a pedestrian's vehicle recognition sound at the rear side of the vehicle. As described above, the sound sensing unit 10 is implemented as a microphone and may take a structure of being arranged at a position separated and spaced apart from the environmentally-friendly vehicle to sense a pedestrian's vehicle recognition sound when the environmentally-friendly vehicle travels and passes through a previously determined location at a corresponding detection speed or being mounted on the environmentally-friendly vehicle to be arranged at a previously set relative position from the sound output unit 70 to sense a sound output from the sound output unit 70. The sound sensing unit 10 may be implemented to sense the pedestrian's vehicle recognition sound in the unit of a previously set speed.

The sound source sound extraction unit 40 extracts and divides the pedestrian's vehicle recognition sound sensed by the sound sensing unit 10 for each of a plurality of frequency bands, and the sound source sound extraction unit 40 can be implemented as a sound processing device formed to be integrated with the sound playback unit 50 described below.

The control unit 20 applies a sound storage control signal to store the frequency band-specific sound data of the pedestrian's vehicle recognition sound extracted and divided by the sound sensing unit 10 in the sound storage unit 33 of the storage unit 30. The frequency band-specific sound data of the pedestrian's vehicle recognition sound stored in the sound storage unit 33 may include frequency band-specific sound level or sound pressure data.

The control unit 20 is connected to other constituent elements of the present invention to receive a predetermined control signal or receives a signal from a corresponding constituent element and controls the environmentally-friendly vehicle sound generator control apparatus.

The sound playback unit 50 includes a sound comparison unit 53, a sound control unit 55 and a sound mixing unit 51. The sound comparison unit 53 compares the frequency band-specific reference sound level stored in the reference data storage unit 35 of the storage unit 30 with a plurality of extracted frequency band-specific sound data sensed by the sound sensing unit and extracted and divided for each frequency band by the sound source sound extraction unit 40 in response to a comparison control signal of the control unit 20, and an example of the frequency band-specific reference sound level implemented as a frequency band-specific minimum sound level is shown in Table 1 below.

TABLE 1

|  | 0~10 km/h | 10~20 km/h | 20~30 km/h | 30 km/h |
|---|---|---|---|---|
| 500 Hz | 43 dBA | 49 dBA | 56 dBA | 60 dBA |
| 2000 Hz | 42 dBA | 48 dBA | 54 dBA | 58 dBA |
| 5000 Hz | 31 dBA | 39 dBA | 43 dBA | 48 dBA | wherein dBA means a unit for expressing magnitude of a sound audible by the ears of a person as dB by applying a weighted filter with respect to a frequency.

The sound source sound extraction unit 40 confirms whether or not there is a frequency band in which a sound pressure level of a plurality of extracted frequency band-specific sound data extracted and divided for each frequency band is smaller than the minimum sound level, and the control unit 20 makes it possible to output a sound of a sound pressure higher than the minimum sound level of a corresponding frequency band by applying a sound control signal to the sound control unit 55.

In other words, when the extracted plurality of frequency band-specific sound data is smaller than the frequency band-specific reference sound level data, the sound control unit 55 controls the pitch or the volume of the plurality of frequency band-specific sample sound source data to form a plurality of frequency band-specific sample control sound source data.

The sound control unit 55 includes a pitch control unit 551 and a volume control unit 553. The pitch control unit 551 includes one or more pitch control points for each frequency band, and the pitch control points enable to form a plurality of new frequency band-specific sample control sound source data by pitch-shifting the plurality of frequency band-specific sample sound source data for each driving speed of the environmentally-friendly vehicle to control the pitch. Although the connection between the pitch control points may take a structure of connecting the pitch control points in various manners, connection between the pitch control points according to this embodiment is implemented in a linear connection method to provide a certain proportionality and takes a method of minimizing the calculation to make a prompt control possible. If a linear connection structure is taken between pitch control points as described above, even when the pitch control points are position-controlled, the linear connection connected between the pitch control points is controlled in association with the pitch control points.

In this embodiment, the frequency band includes a low frequency band lower than 500 Hz, an intermediate frequency band ranging from 2,000 Hz to 5,000 Hz and a high frequency band higher than 5,000 Hz, and this makes it possible to form a pedestrian's vehicle recognition sound which can be recognized by a pedestrian even in a noise of a construction site around a low frequency band of 500 Hz and allows a pedestrian to further easily and conveniently recognize the sound in any environment through a difference of an one third octave band forming change of sound audible by the ears of a person.

In addition, the pitch control unit of the present invention may control the ratio of segment speed to pitch shift between the pitch control points to be higher than 1% per km/h based on the control signal of the control unit 20 when the pitch control points are controlled or may control the pitch control points not to move when the pitch control points move at a ratio less than 1%, and a pedestrian may audibly recognize acceleration or deceleration of the vehicle in a corresponding frequency band through such a configuration.

Figure 4:
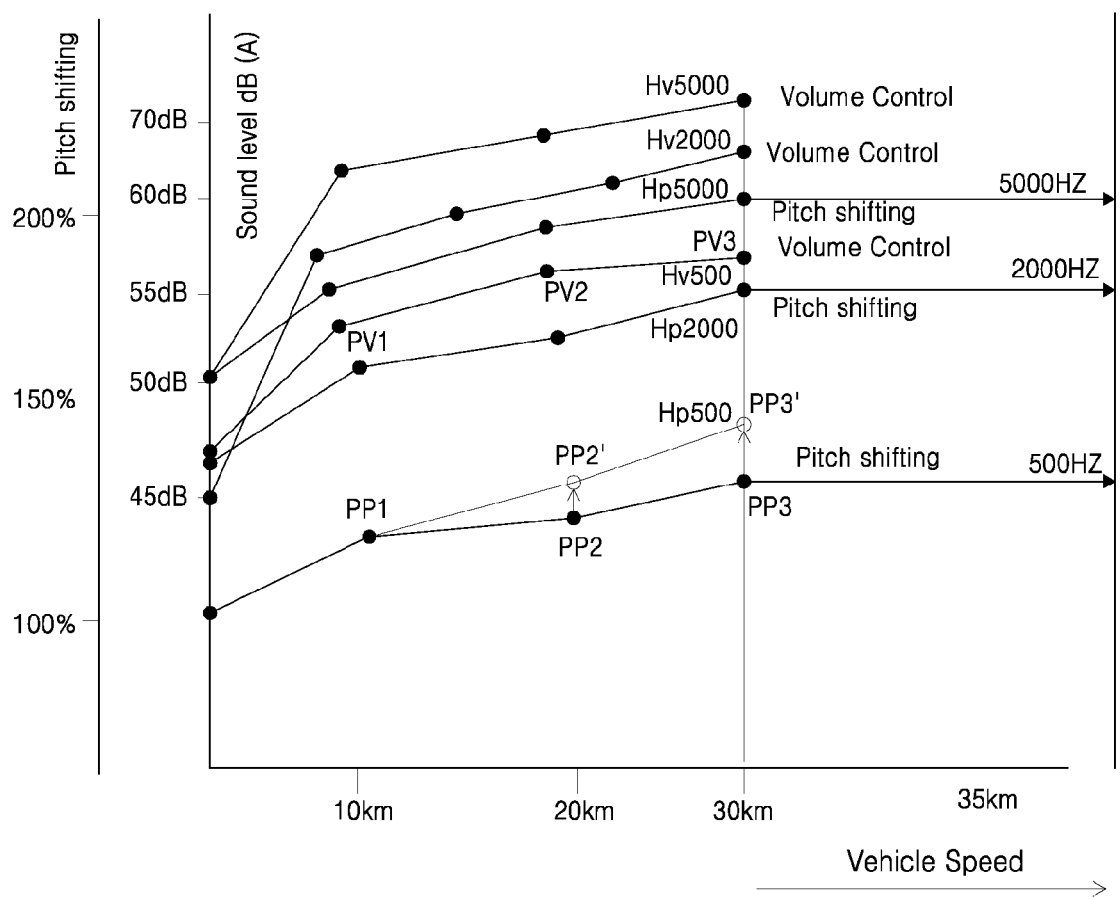
FIG. 4 is a diagram showing frequency and volume with respect to vehicle speed, exemplarily expressing pitch control points and volume control points of an environmentally-friendly vehicle sound generator control apparatus according to an embodiment of the present invention.
Figure 5:
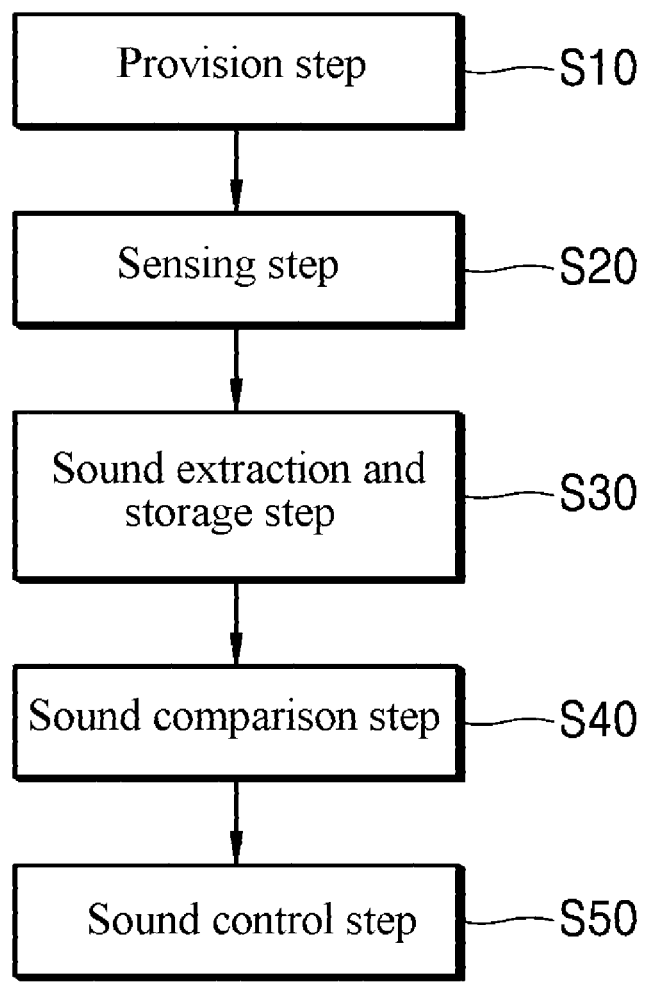
FIG. 5 is a flowchart illustrating a control method of an environmentally-friendly vehicle sound generator control apparatus according to an embodiment of the present invention.
Figure 6:
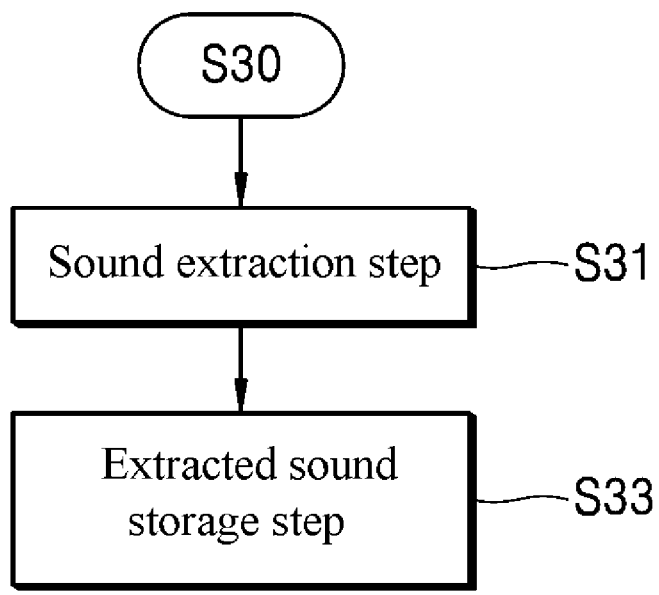
FIGS. 6 to 9 are specific flowcharts illustrating a control method of an environmentally-friendly vehicle sound generator control apparatus according to an embodiment of the present invention.
Figure 7:
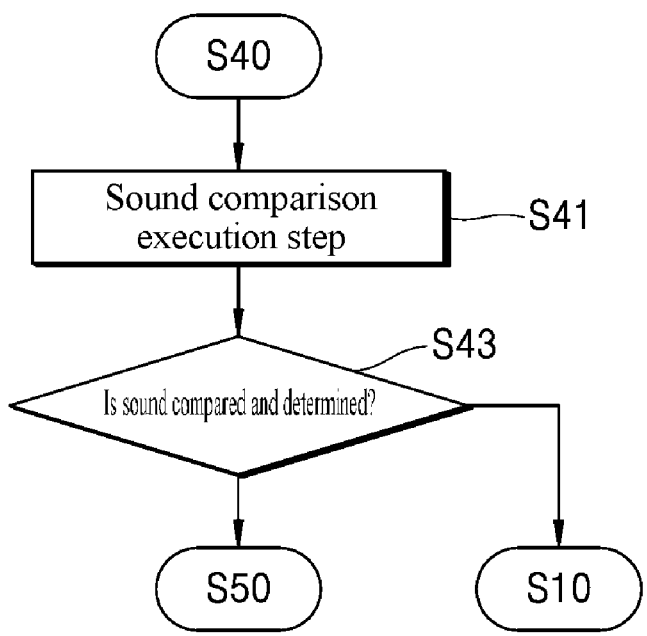
Figure 8:
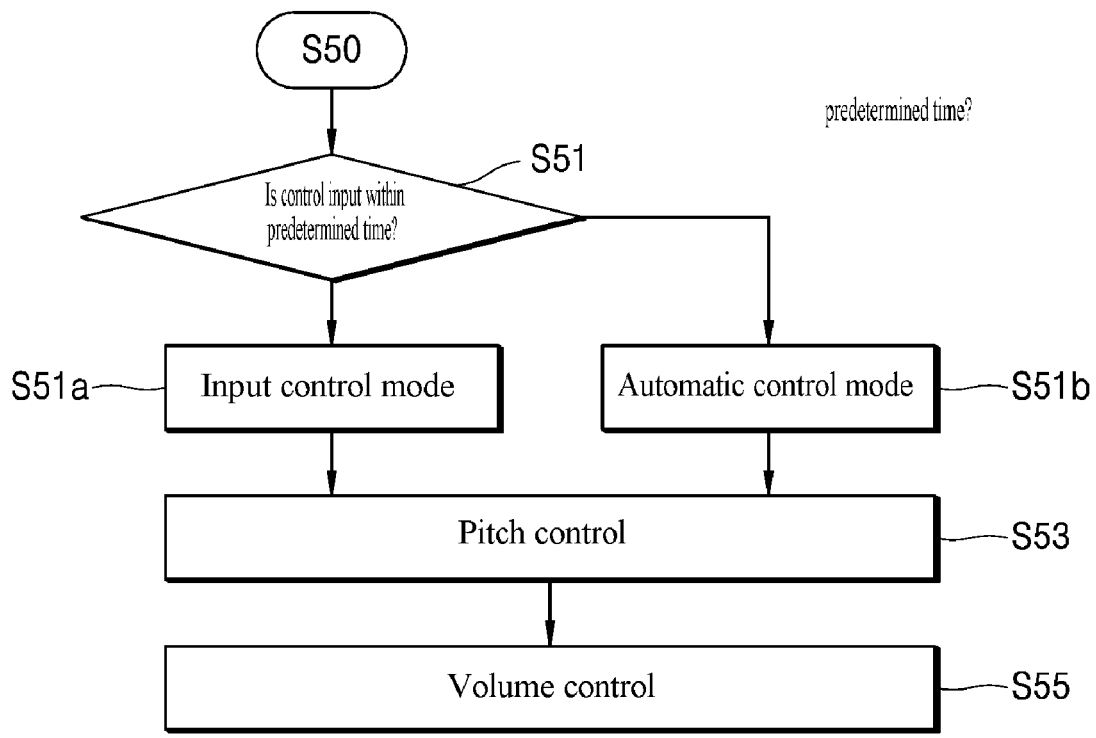
Figure 9:
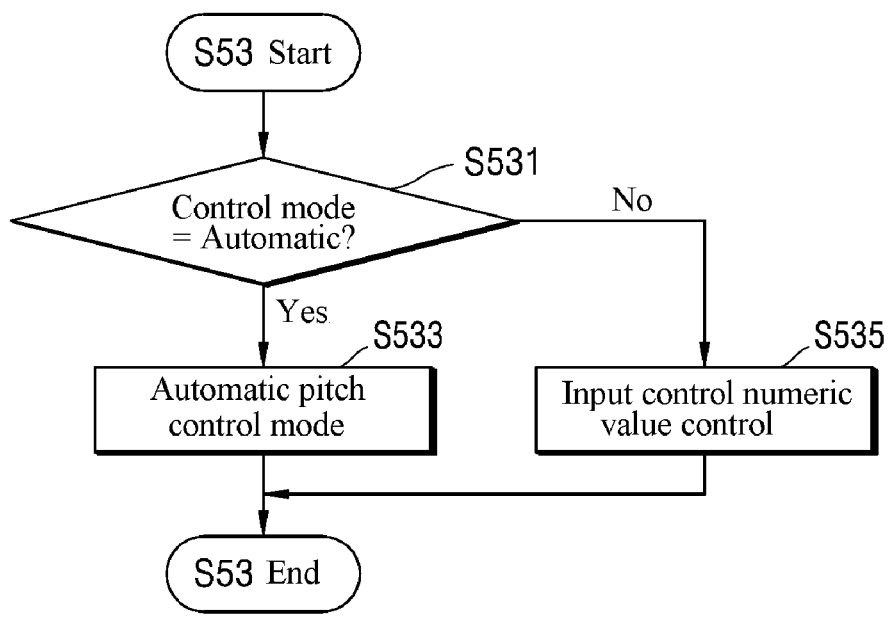

By virtue of this configuration, a sound promptly controlled through certain pitch shifting to conform to the minimum sound level in a corresponding frequency band can be formed. That is, one or more pitch points previously set for each frequency band are shown in FIG. 4, and in this embodiment, the pitch points PP1, PP2 and PP3 are implemented in a method of controlling the pitch points to be operable in the vertical direction as shown in FIG. 4 to perform pitch shifting with respect to a corresponding set speed. In some cases, although the pitch points may also be controlled to be operable in the horizontal direction on the figure and thus may take a method of controlling a corresponding speed of a pitch point, in this embodiment, it is described on the basis of a structure pitch-shifting the pitch points with respect to a corresponding set speed.

For example, if it is determined, at the driving speed of 20 km/h and 30 km/h, that the sound pressure level of an extracted sound data output and sensed at the frequency band of 500 Hz (here, 500 Hz is the center frequency, and a predetermined range around the center frequency is defined as a frequency band) is lower than the sound pressure of the minimum sound level of a corresponding frequency band, the pitch control unit 53 may control the position of the pitch points PP2 and PP3 corresponding to the speed of 20 km/h and 30 km/h to new pitch points PP2' and PP3'. At this point, the position control may take a method of moving the pitch points within a previously set range. That is, if a plurality of extracted frequency band-specific sound data is smaller than the frequency band-specific reference sound level data, the control unit 20 may take a structure of applying, a pitch control signal for controlling the pitch control points PP2 and PP3 of a corresponding frequency band as much as 10% of a pitch control ratio included in the previously set data of the reference data storage unit 35 of the storage unit 30, e.g., a previous pitch control ratio, to the sound control unit 55. At this point, the pitch point PP2 should be controlled by concurrently applying the condition described above that the ratio of the segment speed to pitch shift between pitch control points should be 1% or higher per 1 km/h, and if the linear ratio between the new PP2' and the previous PP3 does not satisfy the 1% or higher per 1 km/h of the ratio of the segment speed to pitch shift between the pitch control points through the position control of the pitch control point PP2, it can be implemented in a method of controlling the position of PP3 to a new position of PP3' within a previously set range of a neighboring pitch control ratio included in the previously set data.

By virtue of this method, the control process of automatically adjusting the pitch to the standard of the minimum sound level through pitch shifting with respect to a corresponding frequency band at a corresponding speed can be performed.

In addition, the volume control unit 553 of the sound control unit 55 includes volume control points for enabling to form a plurality of new frequency band-specific sample control sound source data by increasing or decreasing the volume of a plurality of frequency band-specific sample sound source data for each driving speed of the environmentally-friendly vehicle to control the volume and may control the volume control points PV1, PV2 and PV3.

Like the pitch control points described above, a linear connection is formed between the volume control points PV1, PV2 and PV3, and when the volume control points are position-controlled, the linear connection may also be controlled in association with the volume control points, and a volume control signal may also be applied like the pitch control signal. That is, if a plurality of extracted frequency band-specific sound data is smaller than the frequency band-specific reference sound level data, the control unit 20 may apply a volume control signal for controlling the volume control points of a corresponding frequency band as much as 10% of a volume control ratio included in the previously set data stored in the reference data storage unit 35 of the storage unit 30, e.g., a previous volume pressure level, to the volume control unit 553.

Although it has been described in this embodiment that the volume control signal and the pitch control signal are automatically controlled within a previously set range, in some case, this control method may be modified in various manners, such as taking a method of providing a control input unit 80, transferring a signal corresponding to a pitch control value or a volume control value input through the control input unit 80 to the control unit 20 and applying, by the control unit, a volume control signal and/or a pitch control signal to the volume control unit and/or the pitch control unit.

As described above, a plurality of frequency band-specific sample control sound source data controlled for each frequency band is transferred from the sound control unit 55 to the sound mixing unit 51, and the sound mixing unit 51 mixes the frequency band-specific sample control sound source data corresponding to a frequency band-specific control signal of a low frequency band, an intermediate frequency band or a high frequency band input according to a mixing control signal and transfers the mixed data to the sound output unit 70. A sound source amplification unit 60 is arranged between the sound mixing unit 51 and the sound output unit 70 to amplify the sound output from the sound mixing unit 51 and output the amplified sound through the sound output unit 70.

Hereinafter, a control method of an environmentally-friendly vehicle sound generator control apparatus 1 will be described with reference to the drawings.

First, a control method of an environmentally-friendly vehicle sound generator control apparatus of the present invention includes a provision step (S10), a sensing step (S20), a sound extraction and storage step (S30), a sound comparison step (S40) and a sound control step (S50).

First, an environmentally-friendly vehicle sound generator control apparatus is provided at the provision step (S10), and since the environmentally-friendly vehicle sound generator control apparatus is the same as the structure described above, duplicated description will be omitted and substituted by the above description.

After the environmentally-friendly vehicle sound generator control apparatus is provided, the control unit 20 executes the sensing step (S20) of sensing, by the sound sensing unit 10, a pedestrian's vehicle recognition sound output from the sound output unit of an environmentally-friendly vehicle by applying a sensing control signal to the sound sensing unit 10.

Then, the control unit 20 executes the sound extraction and storage step (S30), and at the sound extraction and storage step (S30), the control unit 20 extracts and divides the pedestrian's vehicle recognition sound sensed by the sound sensing unit 10 for each of a plurality of frequency bands by applying a sound extraction control signal to the sound source sound extraction unit 40 and stores the extracted and divided pedestrian's vehicle recognition sound in the sound storage unit of the storage unit. That is, the sound extraction and storage step (S30) includes a sound extraction step (S31) and an extracted sound storage step (S33).

At the sound extraction step (S31), the control unit 20 applies a sound extraction control signal to the sound source sound extraction unit 40, and the sound source sound extraction unit 40 receiving the sound extraction control signal extracts and divides the pedestrian's vehicle recognition sound sensed by the sound sensing unit 10 for each of a plurality of frequency bands, and the frequency bands is formed of a low frequency band, an intermediate frequency band and a high frequency band as described above. A storage control signal for storing the frequency band-specific pedestrian's vehicle recognition sounds separately extracted at step S31 in the sound storage unit 33 of the storage unit 30 is applied, and the separately extracted frequency band-specific pedestrian's vehicle recognition sounds are stored according to the storage control signal.

Then, the control unit 20 executes the sound comparison step (S40) by applying a comparison control signal to the sound comparison unit 53, and the sound comparison step (S40) includes a sound comparison execution step (S41) and a sound comparison determination step (S43).

First, at the sound comparison execution step (S41), the sound comparison unit 53 compares frequency band-specific reference sound level data with a plurality of extracted frequency band-specific sound data according to the comparison control signal of the control unit 20.

After the sound comparison execution step (S41) is completed, the sound comparison determination step (S43) is executed, and it is determined at the sound comparison determination step (S43) whether or not the extracted plurality of frequency band-specific sound data is smaller than the frequency band-specific reference sound level data, and if the control unit 20 determines at the sound comparison determination step (S43) that the extracted plurality of frequency band-specific sound data is smaller than the frequency band-specific reference sound level data, the control flow proceeds to the sound control step (S50), and contrarily, if the control unit 20 determines that the extracted plurality of frequency band-specific sound data exceeds the frequency band-specific reference sound level data, the control unit 20 determines that a sound source of a form completed with respect to a corresponding speed is formed and terminates the corresponding process or the control flow proceeds to step S10 as a control process for another driving speed.

If it is determined at step S43 that the extracted plurality of frequency band-specific sound data is smaller than the frequency band-specific reference sound level data, the control unit 20 executes the sound control step (S50) for controlling the pitch or the volume of the plurality of frequency band-specific sample sound source data to form a plurality of frequency band-specific sample control sound source data.

The sound control step (S50) may further include a control input determination step (S51) for determining whether or not a signal is input from the control input unit 80. In this case, it is determined whether or not there exists a separate input signal for controlling pitch and volume control points of the pitch control unit 551 and the volume control unit 553, and if any input signal does not exist for a predetermined period of time, a following procedure can be progressed in a method of automatically controlling the pitch and the volume within a previously set range. That is, if it is determined at the control input determination step (S51) that any input signal does not exist for a predetermined period of time, the control unit 20 executes, if the extracted plurality of frequency band-specific sound data is smaller than the frequency band-specific reference sound level data, a pitch control step (S53) for applying, a pitch control signal for controlling the pitch control points PP1, PP2 and PP3 of a corresponding frequency band as much as a pitch control ratio included in the previously set data stored in the storage unit 30, to the sound control unit 55.

That is, if it is determined at the control input determination step (S51) that an input exists for a predetermined period of time, the control flow proceeds to step S51a where the control unit determines that the pitch control to be executed is an input control mode and executes the pitch control step (S53) according to the input pitch control signal. Contrarily, if it is determined at the control input determination step (S51) that any input signal does not exist for a predetermined period of time, the control flow proceeds to step S51b, determines that the pitch control to be executed is an automatic control mode and automatically executes pitch shift as much as previously set.

In some cases, the pitch control step (S53) includes a pitch control mode determination step (S531), and the control flow proceeds according to a corresponding mode at the pitch control mode determination step (S531). If the pitch control mode is an input control mode, the control flow proceeds to step S353 where the control unit 20 performs predetermined pitch shift as much as a control value input through the control input unit 80 (S535).

Contrarily, if it is determined at step S531 that the pitch control mode to be executed is an automatic mode, the control unit 20 executes an automatic pitch control mode (S533). For example, if it is determined that a plurality of extracted frequency band-specific sound data is smaller than the frequency band-specific reference sound level data, the control unit 20 may take a structure of applying a pitch control signal for controlling the pitch control points PP2 and PP3 of a corresponding frequency band as much as 10% of a pitch control ratio included in the previously set data of the reference data storage unit 35 of the storage unit 30, e.g., a previous pitch control ratio, to the sound control unit 55.

At this point, at the step of automatic pitch control mode S533, the pitch point PP2 should be controlled by concurrently applying the condition described above that the ratio of the segment speed to pitch shift between the pitch control points should be 1% or higher per 1 km/h, and if the linear ratio between the new PP2' and the previous PP3 does not satisfy the 1% or higher per 1 km/h of the ratio of the segment speed to pitch shift between the pitch control points through the position control of the pitch control point PP2, it can be implemented in a method of controlling the position of PP3 to a new position of PP3' within a previously set range of a neighboring pitch control ratio included in the previously set data.

In addition, at the same time, if a plurality of extracted frequency band-specific sound data is smaller than the frequency band-specific reference sound level data, the control unit may execute a volume control step (S55) for applying a volume control signal for controlling the volume control points of a corresponding frequency band as much as a volume control ratio included in the previously set data stored in the storage unit to the volume control unit. The pitch control step and the volume control step shown in this embodiment may be individually configured or, in some cases, may be implemented as a pitch and volume control step simultaneously processing the pitch and volume control steps.

Here, in the same manner as described above, it takes a structure in which a plurality of frequency bands includes a low frequency band lower than 500 Hz, an intermediate frequency band ranging from 2,000 Hz to 5,000 Hz and a high frequency band higher than 5,000 Hz, and since a linear connection is formed between the pitch control points, when the pitch control points are controlled, the linear connection may also be controlled in association with the pitch control points, and a ratio of the segment speed to pitch shift between the pitch control points is 1% or higher per km/h, and since a linear connection is also formed between the volume control points, when the volume control points are controlled, the linear connection is also controlled in association with the volume control points.

Figure 11:
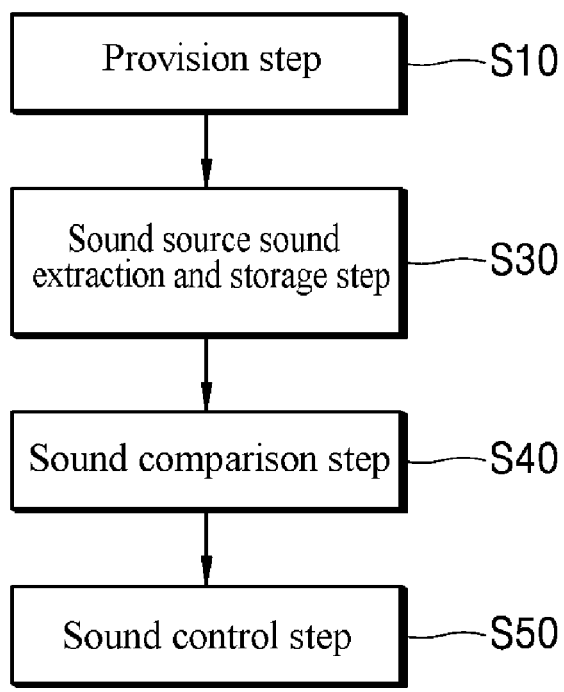
FIGS. 11 and 12 are schematic flowcharts illustrating a control method of an environmentally-friendly vehicle sound generator control apparatus according to another embodiment of the present invention.

Meanwhile, in the embodiment described above, although the sound sensing unit is implemented as a physical input sensing device implemented as a real microphone, the present invention is not limited thereto. It may take a structure of excluding the sound sensing unit and directly transferring a sound data from the sound output unit to the sound source sound extraction unit, and in this case, the sensing step can be excluded from the steps described above (see FIG. 11). In this case, in some cases such as excluding the sound sensing unit and, at the same time, directly transferring the sound data passing through the sound mixing unit to the sound source sound extraction unit, it is apparent that the sound amplification unit and the sound output unit may also be selectively excluded.

On the other hand, the environmentally-friendly vehicle sound generator control apparatus of the present invention and the control method thereof may take a structure in which an output sound output from the sound output unit is input into the sound source sound extraction unit via the sound sensing unit, and the sound sensing unit is not implemented in a real physical input sensing device such as a microphone, but processed by a program as a virtual pseudo means or a virtual pseudo step.

Figure 10:
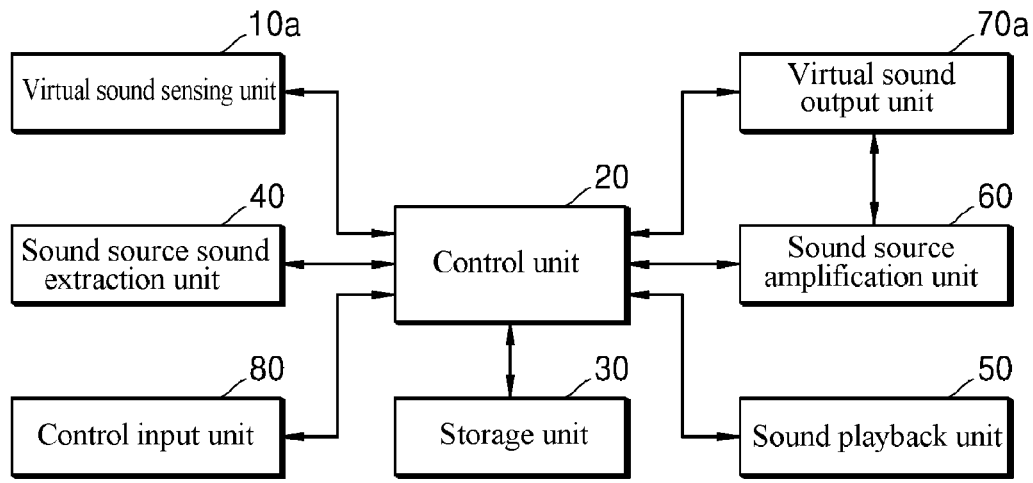
FIG. 10 is a functional block diagram functionally showing the configuration of an environmentally-friendly vehicle sound generator control apparatus according to another embodiment of the present invention.
Figure 12:
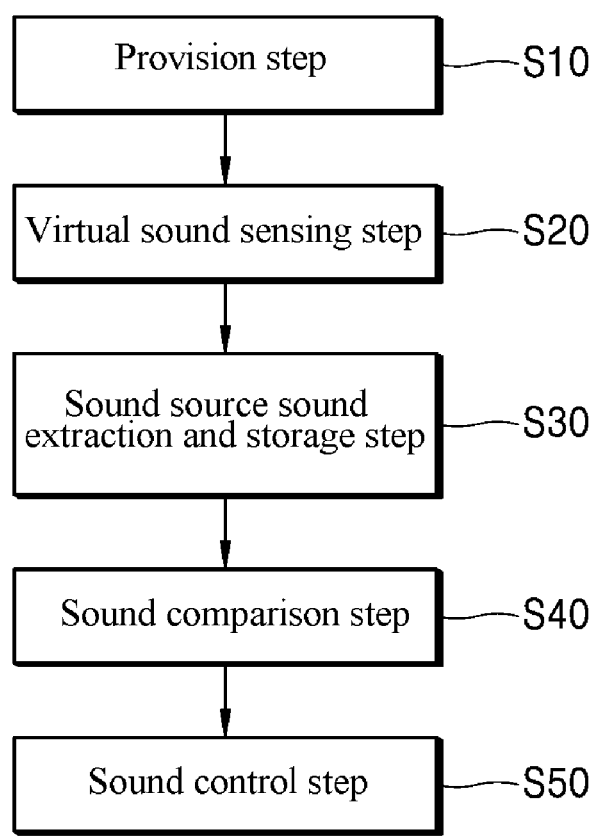

That is, the sound sensing unit according to a modification of an embodiment of the present invention may be implemented as a virtual sound sensing unit which does not exist physically, but is processed by a program. It is apparent that the virtual sound sensing unit 10a may be implemented as an individual signal processing device or may be implemented in a variety of forms such as being integrated in a processing device or a control unit which performs voice processing of other constituent elements as described above. Like this, the sound output from the sound output unit is not sensed physically, and the pedestrian's vehicle recognition sound is transferred to the virtual sound sensing unit 10a (see FIG. 10) in which the pedestrian's vehicle recognition sound is signal-processed considering a pseudo environment in which various variables are realized to take into account a physical environment actually sensed by a pedestrian. Then, a virtual sound sensing step for processing the pedestrian's vehicle recognition sound as a data signal (see FIG. 12) is executed, and the virtually sensed sound, which is signal-processed at the virtual sound sensing step, is transferred to the sound source sound extraction unit so that a data processing procedure for extracting a predetermined sound of each frequency band may be implemented.

In addition, in this case, the sound output unit is also a virtual sound output unit, but not a speaker which actually outputs a physical sound, and it is apparent that the sound output unit can be implemented as a data processing device for transferring data, and the sound amplification unit may also be selectively excluded, if necessary.

While the present invention has been described in connection with the exemplary embodiments illustrated in the drawings, they are merely illustrative and the invention is not limited to these embodiments. It will be appreciated by a person having an ordinary skill in the art that various equivalent modifications and variations of the embodiments can be made without departing from the spirit and scope of the present invention. Therefore, the true technical scope of the present invention should be defined by the technical sprit of the appended claims.

What is claimed is:

1. An environmentally-friendly vehicle sound generator control apparatus comprising:

a storage unit including a sound source storage unit for storing a plurality of frequency band-specific sample sound source data of a real single engine sound of an internal combustion engine vehicle, and a reference data storage unit for storing frequency band-specific reference sound level data;

a sound output unit arranged in an environmentally-friendly vehicle to output a pedestrian's vehicle recognition sound;

a sound sensing unit arranged to be spaced apart from the sound output unit to sense the pedestrian's vehicle recognition sound output from the sound output unit;

a sound source sound extraction unit for extracting and dividing the pedestrian's vehicle recognition sound sensed by the sound sensing unit for each of a plurality of frequency bands;

a control unit for storing the frequency band-specific sound data of the pedestrian's vehicle recognition sound extracted and divided by the sound source sound extraction unit in a sound storage unit of the storage unit; and a sound playback unit including a sound comparison unit for comparing the frequency band-specific reference sound level data with the extracted plurality of frequency band-specific sound data for each frequency band in response to a comparison control signal of the control unit, a sound control unit for controlling the pitch or the volume of the plurality of frequency band-specific sample sound source data to form a plurality of frequency band-specific sample control sound source data if the extracted plurality of frequency band-specific sound data is smaller than the frequency band-specific reference sound level data, and a sound mixing unit for mixing the plurality of frequency band-specific sample control sound source data and transferring the mixed plurality of frequency band-specific sample control sound source data to the sound output unit so that the sound output unit can output the pedestrian's vehicle recognition sound.

2. The environmentally-friendly vehicle sound generator control apparatus according to claim 1, wherein the sound control unit comprises:

a pitch control unit including pitch control points for enabling to form a plurality of new frequency band-specific sample control sound source data by pitch-shifting the plurality of frequency band-specific sample sound source data for each driving speed of the environmentally-friendly vehicle to control the pitch; and a volume control unit including volume control points for enabling to form a plurality of new frequency band-specific sample control sound source data by increasing or decreasing the volume of the plurality of frequency band-specific sample sound source data for each driving speed of the environmentally-friendly vehicle to control the volume.

3. The environmentally-friendly vehicle sound generator control apparatus according to claim 2, wherein the plurality of frequency bands include a low frequency band lower than 500 Hz, an intermediate frequency band ranging from 2,000 Hz to 5,000 Hz and a high frequency band higher than 5,000 Hz.

4. The environmentally-friendly vehicle sound generator control apparatus according to claim 3, wherein a linear connection is formed between the pitch control points, and when the pitch control points are position-controlled, the linear connection is controlled in association with the pitch control points.

5. The environmentally-friendly vehicle sound generator control apparatus according to claim 4, wherein the ratio of the segment speed to pitch shift between the pitch control points is 1% or higher per km/h.

6. The environmentally-friendly vehicle sound generator control apparatus according to claim 3, wherein a linear connection is formed between the volume control points, and when the volume control points are position-controlled, the linear connection is controlled in association with the volume control points.

7. The environmentally-friendly vehicle sound generator control apparatus according to claim 2, wherein if the extracted plurality of frequency band-specific sound data is smaller than the frequency band-specific reference sound level data, the control unit applies, a pitch control signal for controlling the pitch control points of a corresponding frequency band as much as a pitch control ratio included in a previously set data stored in the storage unit, to the sound control unit.

8. The environmentally-friendly vehicle sound generator control apparatus according to claim 2, wherein if the extracted plurality of frequency band-specific sound data is smaller than the frequency band-specific reference sound level data, the control unit applies, a volume control signal for controlling the volume control points of a corresponding frequency band as much as a volume control ratio included in a previously set data stored in the storage unit, to the sound control unit.

9. The environmentally-friendly vehicle sound generator control apparatus according to claim 2, wherein if the extracted plurality of frequency band-specific sound data is smaller than the frequency band-specific reference sound level data, the control unit applies, a pitch and volume control signal for controlling the pitch control points and the volume control points of a corresponding frequency band as much as a pitch control ratio and a volume control ratio included in a previously set data stored in the storage unit, to the sound control unit.

10. A method for controlling an environmentally-friendly vehicle sound generator control apparatus which includes: a storage unit including a sound source storage unit for storing a plurality of frequency band-specific sample sound source data of a real single engine sound of an internal combustion engine vehicle, and a reference data storage unit for storing frequency band-specific reference sound level data; a sound output unit arranged in an environmentally-friendly vehicle to output a pedestrian's vehicle recognition sound; a sound sensing unit arranged to be spaced apart from the sound output unit to sense the pedestrian's vehicle recognition sound output from the sound output unit; a sound source sound extraction unit for extracting and dividing the pedestrian's vehicle recognition sound sensed by the sound sensing unit for each of a plurality of frequency bands; a control unit for storing the frequency band-specific sound data of the pedestrian's vehicle recognition sound extracted and divided by the sound source sound extraction unit in a sound storage unit of the storage unit; and a sound playback unit including a sound comparison unit for comparing the frequency band-specific reference sound level data with the extracted plurality of frequency band-specific sound data for each frequency band in response to a comparison control signal of the control unit, a sound control unit for controlling the pitch or the volume of the plurality of frequency band-specific sample sound source data to form a plurality of frequency band-specific sample control sound source data if the extracted plurality of frequency band-specific sound data is smaller than the frequency band-specific reference sound level data, and a sound mixing unit for mixing the plurality of frequency band-specific sample control sound source data and transferring the mixed plurality of frequency band-specific sample control sound source data to the sound output unit so that the sound output unit can output the pedestrian's vehicle recognition sound, the method comprising:
- a provision step of providing the environmentally-friendly vehicle sound generator control apparatus;
- a sensing step of sensing, by the sound sensing unit, a pedestrian's vehicle recognition sound output from the sound output unit of an environmentally-friendly vehicle;
- a sound extraction and storage step of extracting and dividing the pedestrian's vehicle recognition sound sensed by the sound sensing unit for each of a plurality of frequency bands and storing the extracted and divided pedestrian's vehicle recognition sound in the sound storage unit of the storage unit;
- a sound comparison step of comparing the frequency band-specific reference sound level data with the extracted plurality of frequency band-specific sound data in response to a comparison control signal of the control unit; and
- a sound control step of forming a plurality of frequency band-specific sample control sound source data by controlling the pitch or the volume of the plurality of frequency band-specific sample sound source data if the extracted plurality of frequency band-specific sound data is smaller than the frequency band-specific reference sound level data at the sound comparison step.

11. The method according to claim 10, wherein the sound control unit comprises: a pitch control unit including pitch control points for enabling to form a plurality of new frequency band-specific sample control sound source data by pitch-shifting the plurality of frequency band-specific sample sound source data for each driving speed of the environmentally-friendly vehicle to control the pitch; and a volume control unit including volume control points for enabling to form a plurality of new frequency band-specific sample control sound source data by increasing or decreasing the volume of the plurality of frequency band-specific sample sound source data for each driving speed of the environmentally-friendly vehicle to control the volume, and
wherein the sound control step comprises a pitch control step of, if the extracted plurality of frequency band-specific sound data is smaller than the frequency band-specific reference sound level data, applying, by the control unit, a pitch control signal for controlling the pitch control points of a corresponding frequency band as much as a pitch control ratio included in a previously set data stored in the storage unit, to the sound control unit.

12. The method according to claim 10, wherein the sound control unit comprises: a pitch control unit including pitch control points for enabling to form a plurality of new frequency band-specific sample control sound source data by pitch-shifting the plurality of frequency band-specific sample sound source data for each driving speed of the environmentally-friendly vehicle to control the pitch; and a volume control unit including volume control points for enabling to form a plurality of new frequency band-specific sample control sound source data by increasing or decreasing the volume of the plurality of frequency band-specific sample sound source data for each driving speed of the environmentally-friendly vehicle to control the volume, and
wherein the sound control step comprises a volume control step of, if the extracted plurality of frequency band-specific sound data is smaller than the frequency band-specific reference sound level data, applying, by the control unit, a volume control signal for controlling the volume control points of a corresponding frequency band as much as a volume control ratio included in a previously set data stored in the storage unit, to the sound control unit.

13. The method according to claim 10, wherein the plurality of frequency bands include a low frequency band lower than 500 Hz, an intermediate frequency band ranging from 2,000 Hz to 5,000 Hz and a high frequency band higher than 5,000 Hz.

14. The method according to claim 13, wherein a linear connection is formed between the pitch control points, and when the pitch control points are position-controlled, the linear connection is controlled in association with the pitch control points.

15. The method according to claim 14, wherein the ratio of the segment speed to pitch shift between the pitch control points is 1% or higher per km/h.

16. The method according to claim 13, wherein a linear connection is formed between the volume control points, and when the volume control points are position-controlled, the linear connection is controlled in association with the volume control points.

17. An environmentally-friendly vehicle sound generator control apparatus comprising:
- a storage unit including a sound source storage unit for storing a plurality of frequency band-specific sample sound source data of a real single engine sound of an internal combustion engine vehicle, and a reference data storage unit for storing frequency band-specific reference sound level data;
- a sound output unit for outputting a pedestrian's vehicle recognition sound;
- a sound source sound extraction unit for extracting and dividing the pedestrian's vehicle recognition sound output from the sound output unit for each of a plurality of frequency bands;
- a control unit for storing the frequency band-specific sound data of the pedestrian's vehicle recognition sound extracted and divided by the sound source sound extraction unit in a sound storage unit of the storage unit; and
- a sound playback unit including a sound comparison unit for comparing the frequency band-specific reference sound level data with the extracted plurality of frequency band-specific sound data for each frequency band in response to a comparison control signal of the control unit, a sound control unit for controlling the pitch or the volume of the plurality of frequency band-specific sample sound source data to form a plurality of frequency band-specific sample control sound source data if the extracted plurality of frequency band-specific sound data is smaller than the frequency band-specific reference sound level data, and a sound mixing unit for mixing the plurality of frequency band-specific sample control sound source data and transferring the mixed plurality of frequency band-specific sample control sound source data to the sound output unit so that the sound output unit can output the pedestrian's vehicle recognition sound.

18. The environmentally-friendly vehicle sound generator control apparatus according to claim 17, further comprising further include a sound sensing unit for sensing the pedestrian's vehicle recognition sound output from the sound output unit, wherein the sound sensing unit further comprises a virtual sound sensing unit for transferring a signal by virtually processing the pedestrian's vehicle recognition sound output from the sound output unit as if the pedestrian's vehicle recognition sound was sensed, and wherein the sound source sound extraction unit extracts and divides the pedestrian's vehicle recognition sound virtually sensed by the sound sensing unit for each of a plurality of frequency bands.

19. The control apparatus according to claim 18, wherein the sound output unit is a virtual sound output unit for virtually processing a sound playback data transferred from the sound playback unit and outputting the processed data as a pedestrian's vehicle recognition sound.

20. A method for controlling an environmentally-friendly vehicle sound generator control apparatus, which includes: a storage unit including a sound source storage unit for storing a plurality of frequency band-specific sample sound source data of a real single engine sound of an internal combustion engine vehicle, and a reference data storage unit for storing frequency band-specific reference sound level data; a sound output unit for outputting a pedestrian's vehicle recognition sound; a sound source sound extraction unit for extracting and dividing the pedestrian's vehicle recognition sound output from the sound output unit for each of a plurality of frequency bands; a control unit for storing the frequency band-specific sound data of the pedestrian's vehicle recognition sound extracted and divided by the sound source sound extraction unit in a sound storage unit of the storage unit; and a sound playback unit including a sound comparison unit for comparing the frequency band-specific reference sound level data with the extracted plurality of frequency band-specific sound data for each frequency band in response to a comparison control signal of the control unit, a sound control unit for controlling the pitch or the volume of the plurality of frequency band-specific sample sound source data to form a plurality of frequency band-specific sample control sound source data if the extracted plurality of frequency band-specific sound data is smaller than the frequency band-specific reference sound level data, and a sound mixing unit for mixing the plurality of frequency band-specific sample control sound source data and transferring the mixed plurality of frequency band-specific sample control sound source data to the sound output unit so that the sound output unit can output the pedestrian's vehicle recognition sound, the method comprising:

a provision step of providing the environmentally-friendly vehicle sound generator control apparatus;

a sensing step of sensing, by the sound sensing unit, a pedestrian's vehicle recognition sound output from the sound output unit of an environmentally-friendly vehicle;

a sound extraction and storage step of extracting and dividing the pedestrian's vehicle recognition sound sensed by the virtual sound sensing unit for each of a plurality of frequency bands and storing the extracted and divided pedestrian's vehicle recognition sound in the sound storage unit of the storage unit;

a sound comparison step of comparing the frequency band-specific reference sound level data with the extracted plurality of frequency band-specific sound data in response to a comparison control signal of the control unit; and a sound control step of forming a plurality of frequency band-specific sample control sound source data by controlling the pitch or the volume of the plurality of frequency band-specific sample sound source data if the extracted plurality of frequency band-specific sound data is smaller than the frequency band-specific reference sound level data at the sound comparison step.

21. The method according to claim 20, wherein the environmentally-friendly vehicle sound generator control apparatus further comprises a sound sensing unit for sensing the pedestrian's vehicle recognition sound output from the sound output unit, wherein the sound sensing unit further comprises a virtual sound sensing unit for transferring a signal by virtually processing the pedestrian's vehicle recognition sound output from the sound output unit as if the pedestrian's vehicle recognition sound was sensed, wherein the sound source sound extraction unit extracts and divides the pedestrian's vehicle recognition sound virtually sensed by the sound sensing unit for each of a plurality of frequency bands, wherein the control method further comprises a virtual sensing step of transferring, before executing the sound extraction and storage step, a virtual signal as if the virtual sound sensing unit sensed the pedestrian's vehicle recognition sound output from the sound output unit of the environmentally-friendly vehicle, and wherein the pedestrian's vehicle recognition sound virtually sensed by the sound sensing unit is extracted and divided for each of a plurality of frequency bands at the sound extraction and storage step.

\* \* \* \* \*